United States Patent
Burger et al.

(10) Patent No.: US 7,330,900 B2
(45) Date of Patent: Feb. 12, 2008

(54) LOW-LATENCY PACKET PROCESSOR

(75) Inventors: Eric Burger, Amherst, NH (US); Joel Hughes, Concord, MA (US); David Penny, Braintree, MA (US)

(73) Assignee: Dialogic Corporation, Montreal (CA)

( * ) Notice: Subject to any disclaimer, the term of this patent is extended or adjusted under 35 U.S.C. 154(b) by 729 days.

(21) Appl. No.: 10/190,247

(22) Filed: Jul. 3, 2002

(65) Prior Publication Data

US 2003/0028661 A1   Feb. 6, 2003

Related U.S. Application Data

(60) Provisional application No. 60/303,574, filed on Jul. 6, 2001.

(51) Int. Cl.
*G06F 15/16* (2006.01)
*H04L 12/56* (2006.01)

(52) U.S. Cl. .................. 709/231; 709/232; 370/416; 718/104; 718/105

(58) Field of Classification Search ............... 709/226, 709/229, 231–232; 718/104–106; 370/416
See application file for complete search history.

(56) References Cited

U.S. PATENT DOCUMENTS

| | | | | |
|---|---|---|---|---|
| 5,802,041 A | * | 9/1998 | Waclawsky et al. | 370/245 |
| 5,805,821 A | * | 9/1998 | Saxena et al. | 709/231 |
| 5,852,705 A | * | 12/1998 | Hanko et al. | 386/92 |
| 5,948,065 A | * | 9/1999 | Eilert et al. | 709/226 |
| 5,983,004 A | * | 11/1999 | Shaw et al. | 709/227 |
| 5,999,525 A | * | 12/1999 | Krishnaswamy et al. | 370/352 |
| 6,044,061 A | * | 3/2000 | Aybay et al. | 370/230 |
| 6,134,217 A | * | 10/2000 | Stiliadis et al. | 370/232 |
| 6,138,189 A | * | 10/2000 | Kalkunte | 710/53 |
| 6,160,812 A | * | 12/2000 | Bauman et al. | 370/416 |
| 6,185,221 B1 | * | 2/2001 | Aybay | 370/412 |
| 6,298,071 B1 | * | 10/2001 | Taylor et al. | 370/486 |
| 6,434,620 B1 | * | 8/2002 | Boucher et al. | 709/230 |
| 6,493,872 B1 | * | 12/2002 | Rangan et al. | 725/32 |
| 6,567,564 B1 | * | 5/2003 | van der Wal | 382/260 |
| 6,665,872 B1 | * | 12/2003 | Krishnamurthy et al. | 725/95 |
| 6,678,267 B1 | * | 1/2004 | Anandakumar et al. | 370/356 |

(Continued)

*Primary Examiner*—Valencia Martin-Wallace
*Assistant Examiner*—Saket K. Daftuar
(74) *Attorney, Agent, or Firm*—Weingarten, Schurgin, Gagnebin & Lebovici LLP (57) ABSTRACT

Packets of real-time media streams are processed at a network node such within a desired maximum latency less than the frame interval of the streams. The media streams have respective packet rates all substantially equal to a nominal packet rate and respective packet arrival times that are generally non-deterministic. The streams are assigned to digital signal processors (DSPs), each capable of processing up to a predetermined maximum number of the streams within real-time constraints. The number of streams assigned to each DSP is less than the predetermined maximum number and no greater than the quotient of a desired maximum processing latency less than the frame interval and the DSP processing latency for a single packet. For example, if the desired maximum processing latency is 5 ms. and the processing latency for one packet is 1.6 ms., then only three streams are assigned to a DSP (5/1.6~3), even if the DSP can process many more than 3 streams in real time. The technique can also be applied to groups of streams whose respective packet arrival times are generally deterministic. Different groups can be processed by a DSP without incurring an entire frame interval of latency, potentially resulting in more efficient use of the DSPs.

16 Claims, 3 Drawing Sheets

U.S. PATENT DOCUMENTS

| | | | |
|---|---|---|---|
| 6,717,933 B1 * | 4/2004 | Sonning et al. | 370/342 |
| 6,765,904 B1 * | 7/2004 | Anandakumar et al. | 370/389 |
| 6,771,703 B1 * | 8/2004 | Oguz et al. | 375/240.03 |
| 6,785,262 B1 * | 8/2004 | Yao et al. | 370/352 |
| 6,888,893 B2 * | 5/2005 | Li et al. | 375/240.25 |
| 6,954,800 B2 * | 10/2005 | Mallory | 709/240 |

* cited by examiner

LOW-LATENCY PACKET PROCESSOR

CROSS REFERENCE TO RELATED APPLICATIONS

This application claims priority under 35 U.S.C. §119(e) of U.S. Provisional Patent Application No. 60/303,574 filed Jul. 6, 2001.

STATEMENT REGARDING FEDERALLY SPONSORED RESEARCH OR DEVELOPMENT

Not Applicable

BACKGROUND OF THE INVENTION

The present invention is related to the field of media processing, such as processing of voice or other audio signals in a telephone network.

Media processing is employed when it is desirable to perform some kind of transformation on a digital representation of an analog signal. In telephone or other voice systems, for example, it is common to apply a compression transformation on digital voice signals in order to improve transmission efficiency by reducing bandwidth requirements. A corresponding de-compression transformation is applied to received compressed signals. Other common examples include various forms of filtering and "scrambling", or encoding for purposes of security.

Devices through which multiple channels of voice or other analog signals flow typically employ one or more digital signal processors (DSPs) to carry out the desired processing. Hardware and/or software within the device is responsible for assigning channels to DSPs, steering received data of the various channels to the appropriate DSP(s) for processing, and re-combining the processed channel data in some form for re-transmission to another device. The number of DSPs employed at a given device is determined in part by the number of channels and the expected processing load per channel. If the processing algorithm for one channel consumes all the processing capacity of a DSP, then it is generally necessary to have one DSP per channel. If each DSP has sufficient processing capacity to handle the processing load for multiple channels, then fewer DSPs are required.

In conventional telephone systems, which are based on time-division-multiplexing (TDM) technology, the processing of multiple channels by a single DSP takes a special form. In TDM systems, all of the channels are synchronous with respect to each other, and therefore it is a simple matter to divide the use of a DSP into a given number of time slots and allocate the time slots to respective channels. There is a certain rigidity in the operation, however, that tends to favor a particular manner of use of the DSP. Whatever frame interval is employed for collecting sufficient channel data for a quantum of processing, there is no benefit from a latency perspective to processing the data frame in any time less than the frame interval, because there is no opportunity to output the processed frame until an entire frame interval has passed. Given that the latency through a TDM device is determined by the signalling format rather than the actual processing time, and that the relative timing of the channels is so well known, it makes sense to simply load each DSP with the maximum number of channels it can handle while meeting real-time constraints, i.e., while processing frames at least as fast as frames are provided to the DSP. This approach makes full utilization of each DSP, promoting efficiency as measured in a "cost per channel" sense.

In recent times, techniques have evolved for transmitting voice and other media data over non-synchronous networks such as Internet Protocol (IP) networks. In contrast to TDM networks, there is no necessary timing relationship among different "channels", or distinct streams of media data. Even when the nominal data rates of different channels are the same, which would be the case for example for channels carrying voice encoded according to the same encoding algorithm, there is considerable variability in the relative arrival times of packets of the different channels at a given network device. At one instant, it may be that packets of channels 1, 2 and 3 are received sequentially in that order, while at another instant, they may all be received substantially simultaneously or even in reverse order.

It may be desirable in certain applications that a network node add only a minimal amount of latency to media streams. This may be the case, for example, if a node is operating in series with other equipment that adds considerable latency that approaches an overall end-to-end latency goal for a channel. In such cases, it would be desirable for packets to be processed as quickly as possible, without wasting time in buffers for purposes of synchronization with a DSP or other packet streams. However, the prevailing architecture for processing multiple media channels forces each stream to be processed by a fully-loaded DSP, which can result in latency far above what might be desired in a given system. It would be desirable to process packet media streams in a manner that would enable stricter latency goals to be met.

BRIEF SUMMARY OF THE INVENTION

In accordance with the present invention, a method and apparatus are disclosed for processing packets of a number of real-time media streams at a network node such that a desired maximum latency less than the frame interval of the streams is met.

The disclosed method and apparatus pertain to media streams characterized by respective packet rates that are substantially equal to a nominal packet rate and by respective packet arrival times at the network node that are generally non-deterministic, so that in general it is not known when a packet for a given stream will be received with respect to the packets of the other streams. The inverse of the nominal packet rate of the media streams is referred to as a frame interval.

The packets of the respective media streams are assigned to corresponding digital signal processors (DSPs) at a network node, wherein each DSP has sufficient processing capacity to process the packets of up to a predetermined maximum number of the media streams within real-time constraints. The number of media streams assigned to each DSP is less than the predetermined maximum number and no greater than the quotient of a desired maximum processing latency less than the frame interval and the DSP processing latency for a single packet. Thus, if the desired maximum processing latency is 5 ms., for example, and the processing latency for one packet is 1.6 ms., then only three streams are assigned to a DSP, even if the DSP has the capacity to process 10 or more streams in real time. The packets of each media stream are buffered as necessary to facilitate the sequential processing of the packets within the respective DSP, and each DSP continually processes the buffered packets of the assigned media streams.

The disclosed technique can also be applied to groups of streams among which there are more deterministic timing relationships. Packets of different groups can be processed by a given DSP without incurring an entire frame interval of latency, potentially resulting in more efficient use of the DSPs.

Other aspects, features, and advantages of the present invention will be apparent from the detailed description that follows.

BRIEF DESCRIPTION OF THE SEVERAL VIEWS OF THE DRAWING

The invention will be more fully understood by reference to the following Detailed Description of the Invention in conjunction with the Drawing, of which.

DETAILED DESCRIPTION OF THE INVENTION

The disclosure of U.S. Provisional Patent Application No. 60/303,574 filed Jul. 6, 2001 is incorporated herein by reference.

Figure 1:
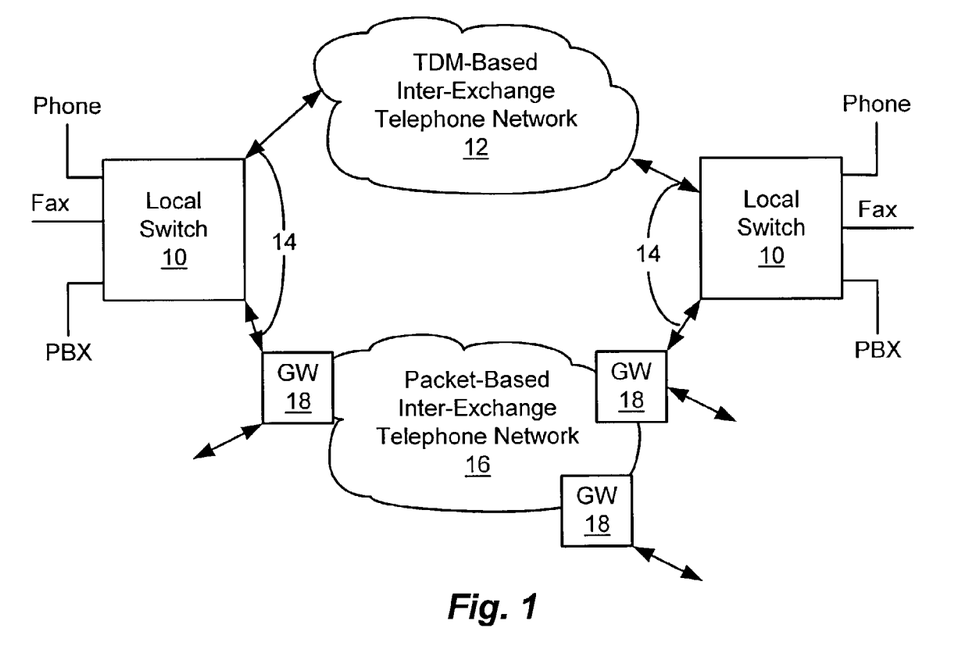
FIG. 1 is a block diagram of a hybrid telephone network containing a packet-based inter-exchange network in accordance with the present invention.

FIG. 1 shows a telephone network in which devices such as telephones, facsimile machines, and private branch exchanges (PBXs) are connected to respective local switches 10. Communications sessions or calls, which may be voice calls, facsimile calls, modem calls, or other types of calls, are carried between participating devices via connections that are established between the respective local switches 10. For purposes of this description, the data exchanged between call participants is referred to as "media". Thus, the media for a voice call consists of data representing encoded speech, and the media for a modem call represents complex tone patterns that in turn represent digital information.

As shown in FIG. 1, the connections between local switches 10 may be established through a conventional inter-exchange network 12 in which the calls are carried over links that employ time division multiplexing (TDM), such as a T1 link or an ISDN Primary Rate Interface (PRI). Links 14 shown between each local switch 10 and the TDM-based network 12 are of this type, as are links (not shown) within the TDM-based network 12. Alternatively, the connections can be established through a packet-based telephony network 16 via gateways 18. The gateways 18 serve to adapt the TDM-based transmission format of the local switches 10 to a packet-based format used for transmission within the packet-based network 16. An exemplary packet-based telephony network 16 employs the Internet Protocol (IP) and related protocols for packet transmission, for example. Other suitable packet-based protocols can also be employed.

Figure 2:
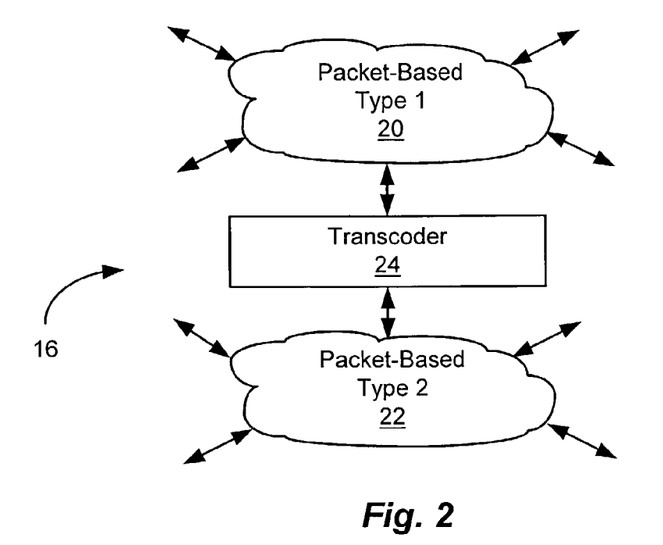
FIG. 2 is a block diagram of the packet-based inter-exchange network of FIG. 1.

As shown in FIG. 2, the packet-based telephony network 16 may include different sub-networks 20 and 22 of different types, shown generally as "Type 1" and "Type 2". In particular, the sub-networks 20 and 22 may use different media encoding schemes that are not directly compatible with each other. For example, sub-network 20 may employ a voice encoding technique known as G.711 encoding as defined by the ITU, whereas sub-network 22 may employ a different technique such as G.723.1 or G.729 encoding. These different encoding schemes are distinguished by a variety of factors, including their specific packet formats and the degree of "compression" they achieve. "Compression" refers to a reduction in the amount of data required to represent the voice signal with respect to some reference, such as a straight pulse-code representation of the sampled voice signal.

Although the connections for many calls are made entirely within either sub-network 20 or 22 individually, in some cases calls are carried through both sub-networks 20 and 22. For example, the sub-networks 20 and 22 may provide service in different geographic areas, and therefore calls between parties in such different areas are carried across both sub-networks. To accommodate this need, one or more transcoders 24 are used. A transcoder 24 performs a translation between the different media encoding schemes used in the two subnetworks 20 and 22. Packets originating in sub-network 20 are converted into packets of the type used in sub-network 22, and these converted packets are transmitted into the sub-network 22. Similarly, packets originating in sub-network 22 are converted into packets of the type used in sub-network 20, and these converted packets are transmitted into the sub-network 20. Although only one transcoder 24 is shown in FIG. 2, in general there may be multiple transcoders 24 deployed as desired to accommodate the traffic load between different sub-networks. Also, a transcoder 24 may connect to more than two sub-networks, and generally may perform translations among more than two encoding schemes or protocols.

One important performance characteristic in a telephone network is the transmission delay or latency experienced by the media. In a 2-way voice telephone call, for example, latency greater than 250 milliseconds can severely degrade the quality of the call. Unfortunately, encoding schemes of the type used in the packet-based network 16 of FIGS. 1 and 2 often add significant latency to the media. In most encoding schemes, the media originating at the source is divided into a series of frames of a given length, and each frame is processed as a unit by processing elements in the network. Typical frame intervals are in the range from 2.5 to 30 milliseconds. There is delay in gathering an entire frame of media before beginning to process it. Once a frame has been formed, there is delay in encoding it, transmitting the encoded frame through the network toward the destination device, and decoding the encoded frame to recover the original media. This problem of latency is potentially significant in a hybrid packet-based network such as the network 16 of FIG. 2. Each of the sub-networks 20 and 22 adds its own latency, causing the end-to-end latency to be well above 100 milliseconds apart from any latency caused by the transcoder 24. Therefore, the transcoder 24 must operate within a very stringent latency budget if call quality is not to be unduly sacrificed.

Figure 3:
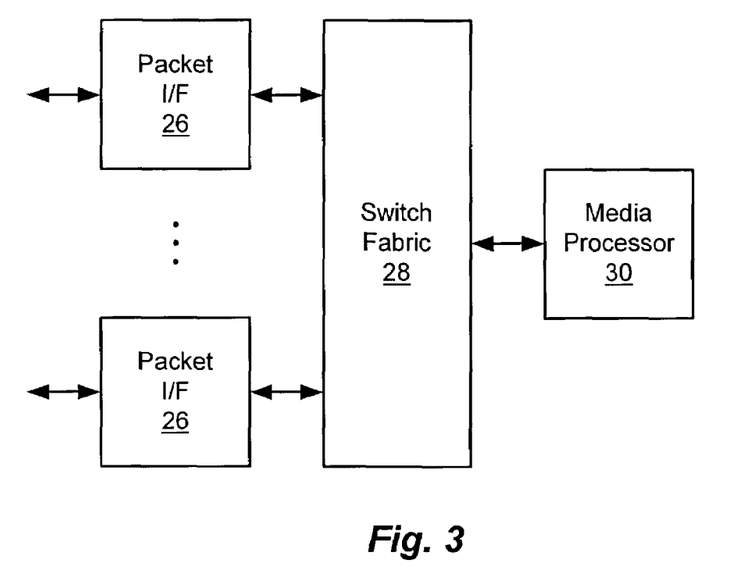
FIG. 3 is a block diagram of a transcoder in the packet-based inter-exchange network of FIG. 2.

FIG. 3 shows the general structure of the transcoder 24. A number of packet network interfaces 26 are coupled to a switch fabric 28, which in turn is coupled to a media processor 30. The packet network interfaces 26 send and receive packets to/from respective packet-based subnetworks such as subnetworks 20 and 22 of FIG. 2 using appropriate protocols. One widely used set of protocols is the Real Time Protocol (RTP) in conjunction with the Internet Protocol (IP). Other sets of protocols, such as Asynchronous Transfer Mode (ATM) with ATM Adaptation Layer (AAL) protocols, may also be used. The different packet network interfaces 26 need not be of the same type. In one embodiment, the packet network interfaces 26 utilize specialized network processors such as those known as IXP 1200 sold by Intel Corporation.

The switch fabric 28 serves to route packet data between each packet network interface 26 and the media processor 30. At present, there are commercially available switch fabrics that utilize standard interface logic taken from the domain of ATM switches. Alternative switch fabrics can also be employed.

Figure 4:
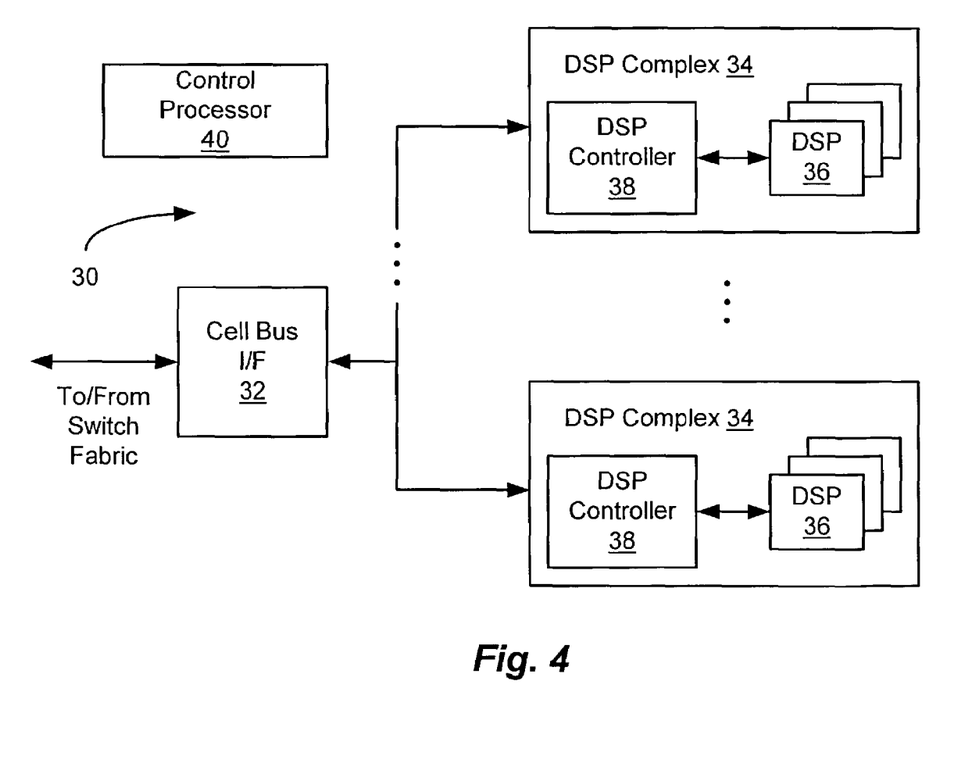
FIG. 4 is a block diagram of a media processor in the transcoder of FIG. 3.

FIG. 4 shows details of the media processor 30. A cell bus interface 32 directs packets between the switch fabric 28 of FIG. 3 and one or more DSP complexes 34. Each DSP complex 34 includes an array of DSPs 36 such as the TMS320VC5441 sold by Texas Instruments Inc. A DSP controller 38 provides management and control functions for the DSPs 36. For example, the DSP controller 38 serves as the boot and initialization engine for the array of DSPs 36, and maintains RTP Control Protocol (RTCP) statistics. The DSP controller 38 may be connected to a host processor interface (HPI) of the DSPs 36, or may be connected to a serial I/O port.

A control processor 40 performs board-level management functions, such as loading boot images for the DSP controller 38, loading field-programmable gate array (FPGA) images for the cell bus interface 32, providing Simple Network Management Protocol (SNMP) management interfaces, etc.

Figure 5:
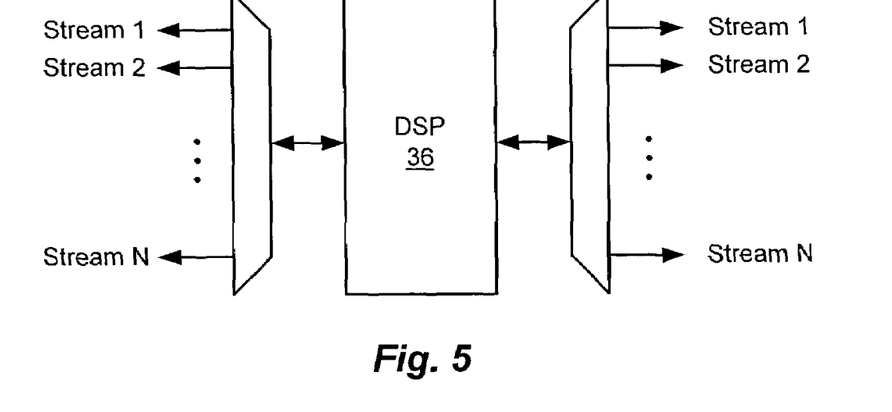
FIG. 5 is a diagram illustrating multiplexing and demultiplexing of multiple media streams to and from a digital signal process (DSP) within the media processor of FIG. 4.

As depicted generally in FIG. 5, each DSP 36 is generally capable of handling the encoding and/or decoding for a number of distinct media streams (e.g., streams 1-N as shown in FIG. 5). For example, a single DSP "core" in the quad-core 5441 (mentioned above) has a performance of approximately 200 million instructions per second (MIPS), whereas a typical transcoding algorithm may require 20-50 MIPS of processing power. Therefore, a single DSP 36 is capable of meeting the real-time demands of some maximum number of streams, depending on the encoding scheme used. The table below shows some typical DSP applications and the maximum number of streams that can currently be handled by DSPs 36.

| Application | Description | Steams per DSP core |
| --- | --- | --- |
| Universal G711 | Performs all necessary processing for typical PCM sessions. | 12 |
| Universal CODEC | Universal G.711 plus all other CODECs | 4 |

-continued

| Application | Description | Steams per DSP core |
| --- | --- | --- |
| FAX | Performs complete fax store and forward application | 5 |
| MP3 | Decodes MP3 media for announcement play out. | 3 |

Figure 6:
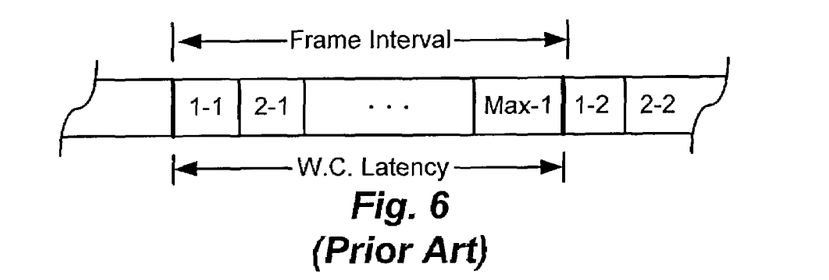
FIG. 6 is a diagram depicting the processing of packets of multiple media streams by a DSP as is known in the art.

FIG. 6 illustrates the timing of the operation of a DSP 36 on a maximum number of streams. In FIG. 6, processing occurs in regular "Frame Intervals" generally imposed by the particular encoding algorithm being employed. For example, the Frame Interval can be 5, 10 or 20 milliseconds in various forms of G.711 encoding. As shown, a DSP 36 processes a single packet from a number of different streams 1, 2, . . . , MAX. These packets are denoted 1-1, 2-1, . . . , MAX-1. At the end of one Frame Interval, the DSP begins processing the next packet from each of the streams, i.e., packets 1-2, 2-2, . . . , MAX-2.

While FIG. 6 portrays a very regular flow to the packet processing, it will be appreciated that the nature of the packet flows for multiple media streams at the network level exhibits much greater irregularity. Within a given stream, the packet spacing can vary considerably over time, and the timing relationships among streams can also vary considerably over time. Accordingly, various mechanisms are used for smoothing streams and for making timing adjustments to permit the sharing of resources such as the DSPs 36. For an individual stream, a jitter buffer may be used to reduce the variance in packet spacing. Dynamically-controlled FIFO buffers are also used to permit a substantially continuous feed of packets from multiple streams to a DSP 36.

It is economically advantageous for each DSP 36 to be assigned the maximum number of streams that it can process while meeting real-time constraints. In this way, the per-stream cost of the DSP 36, and of a processing system such as a gateway 18 or transcoder 24, is minimized. Stated another way, such a system is optimized for capacity in the sense of supporting the maximum number of streams for a given system cost.

Due to the highly variable nature of transmission in the packet-based network 16, packets for streams assigned to the same DSP 36 may arrive substantially simultaneously. In such a case, the last packet processed by the DSP in a given Frame Interval experiences a worst-case latency equal to the Frame Interval. This situation is also shown in FIG. 6. If it is assumed that all the packets 1-1, 2-1, . . . , MAX-1 arrive just prior to the beginning of the Frame Interval, then the processing for packet MAX-1 is not completed until the very end of the Frame Interval, as shown. It is assumed that the packets are all buffered in some fashion so as to be fed to the DSP sequentially. When the Frame Interval is sufficiently long, such as the 20 or 30 milliseconds of some encoding schemes, substantial latency can be added to the media waiting for an assigned DSP 36 to become available.

Figure 7:
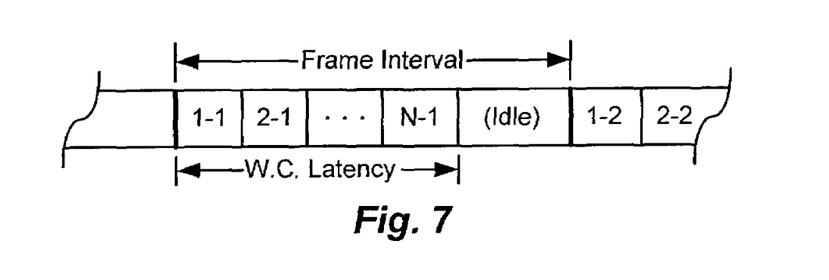
FIG. 7 is diagram depicting the processing of packets of multiple media streams by a DSP in accordance with the present invention.

FIG. 7 illustrates an alternative processing scheme that can reduce the worst-case latency experienced by a stream due to its sharing of a DSP 36 with other streams. The number of streams assigned to each DSP 36 is reduced to less than the maximum that is imposed by purely real-time constraints. For example, if a DSP 36 is capable of processing packets of 10 streams in a Frame Interval, then some number fewer than 10 streams are assigned to the DSP 36. The exact number is dictated by latency goals rather than throughput goals. If, for example, a system has a target latency of 5 milliseconds, and the processing for each packet requires 1.67 milliseconds, then only 3 streams are assigned to a DSP 36. As a result, the worst-case latency is 3×1.67=5 milliseconds.

Figure 8:
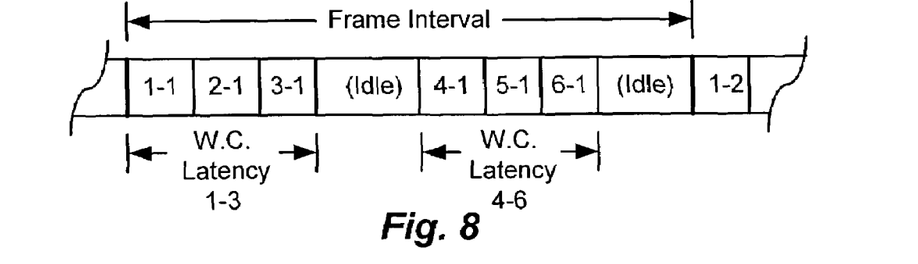
FIG. 8 is diagram depicting the processing of packets of multiple media streams by a DSP in accordance with another aspect of the present invention.

As shown in FIG. 7, a DSP 36 assigned fewer than the maximum number of streams is idle for a considerable period during each Frame Interval, and therefore is being inefficiently used in the "cost per stream" sense. In some cases, users will be willing to bear the higher costs associated with such inefficient use in order to obtain the improved channel performance associated with reduced end-to-end latency. For those applications in which cost is still an issue, it may be possible to make more efficient use of a DSP 36 if there is information about the timing relationships among different streams. This situation is shown in FIG. 8. In this case, it is assumed that the timing relationships among streams 1, 2 and 3 are generally non-deterministic, as are the timing relationships among streams 4, 5 and 6. However, it is known that the arrival times for packets belonging to streams 4, 5 and 6 are generally offset from the arrival times for packets belonging to streams 1, 2 and 3 by a generally deterministic amount, such as approximately one-half the Frame Interval. In this case, these streams can all be processed by the same DSP while satisfying the desired low latency goal. The first group is allocated for processing in the first half of the frame interval, and the second group in the second half of the frame interval. The worst-case latency experienced by any packet is still only three packet processing times, or 5 milliseconds in the above example. Of course, this technique can be extended in accordance with the statistics of the streams. In may be possible, for example, to assign three or more sets of streams to a DSP 36 if there is sufficient knowledge about the timing relationships among the three sets. If there are a sufficiently large number of streams to choose from, it may be possible to assign individual streams having generally known offsets from each other.

Additionally, the allocation of streams to DSPs can be done on a dynamic, rather than static, basis, which can improve efficiency and/or performance. Using the same example as above, suppose that three streams are initially allocated to a first DSP and three streams to a second DSP. Upon analyzing the traffic patterns during operation, it may be determined that one of the streams on the second DSP fits into the idle times of the first DSP. If so, that stream can be safely moved to the first DSP, freeing up a processing slot on the second DSP. Likewise, the converse can be done. If it is determined that a given DSP is loaded beyond its calculated worst-case capacity to meet a desired performance target (such as a predetermined maximum desired latency), and a particular stream is identified as interfering with other streams, the interfering stream can be moved to another DSP. Note that the stream that is moved away may not be the stream that was last allocated to the DSP. If an earlier-allocated stream has more collisions with other streams than does the last-allocated stream, then it makes more sense to move the earlier-allocated stream to another DSP.

The foregoing describes the processing of streams on a packet-by-packet basis, the term "packet" having its normal meaning as a self-contained unit of data transfer in a communications network (such as an IP packet). It is anticipated that, in most embodiments, it will be desirable for processing to be performed in exactly such a manner, with the desired worst-case latency being specified as a fraction of the inverse of the nominal packet rate (referred to as the Frame Interval above). In some cases, however, it may be desirable that there not be such a 1:1 coupling between the unit of processing and the unit of data transfer in the network. For example, it may be desirable to process each stream in units consisting of two sequential packets of the stream. In such a case, it is necessary to employ additional buffering in order to collect two packets for each stream for such pair-wise processing. In such an embodiment, the Frame Interval for processing is twice the inverse of the nominal packet rate, and the desired worst-case latency is some fraction of this longer Frame Interval (although not necessarily less than the inverse of the packet rate). The number of streams assigned to each DSP is less than the quotient of the desired worst-case latency and the processing time for each processing unit, which in this case would be a pair of packets. The description herein, such as that accompanying FIGS. 7 and 8 above, is applicable to such embodiments if each of the units 1-1, 2-1, etc. is understood to be a processing unit equal to a predetermined number of individual packets, wherein the predetermined number could be one or some number other than one.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. A method of processing packets of a plurality of real-time media streams at a network node, the method comprising:

determining a desired maximum latency for processing the plurality of media streams at the network node, each media stream being characterized by a packet rate that is substantially equal to a corresponding nominal packet rate and by packet arrival times that are generally non-deterministic, the inverse of the nominal packet rate being a frame interval;

processing each stream in processing units, each processing unit being equal to a predetermined number of sequential packets of the stream;

assigning the packets of a number of the respective media streams to a digital signal processor (DSP) at the network node, the DSP having sufficient processing capacity to process the packets of up to a predetermined maximum number of the media streams within the frame interval with real-time constraints, wherein the number of media streams assigned to the DSP is less than the predetermined maximum number and no greater than a quotient of the desired maximum processing latency which is less than the frame interval and a DSP processing latency for a single processing unit;

buffering the packets of each media stream for sequential processing of the processing units by the DSP; and in the DSP, continually processing, by processing unit, the buffered packets of the media streams assigned to the DSP.

2. A method according to claim 1, wherein the predetermined number of packets in each processing unit is one.

3. A method according to claim 1, wherein the predetermined number of packets in each processing unit is an integer greater than one.

4. A method according to claim 1, wherein the plurality of real-time media streams includes first and second media streams, said method further comprising:

assigning the packets of a number of the respective, second media streams to the DSP, each second media stream being characterized by a packet rate that is substantially equal to a corresponding nominal packet rate and by packet arrival times at the network node that are generally non-deterministic among themselves but generally deterministic with respect to the packet arrival times of the packets of the first media streams, wherein each second stream is also processed in processing units equal to the predetermined number of sequential packets of the stream, the number of second media streams assigned to the DSP being less than the difference between the predetermined maximum number and the number of first media streams assigned to the DSP and no greater than the quotient of the predetermined desired maximum processing latency and the DSP processing latency for a single processing unit;

buffering the packets of each second media stream for sequential processing of the processing units by the respective DSP; and in the DSP, continually processing, by processing unit, the buffered packets of the second media streams assigned to the DSP along with the buffered packets of the first media streams assigned to the DSP.

5. A method according to claim 1, wherein the media streams are encoded telephony media streams.

6. A method according to claim 1, wherein the media streams are telephony media streams encoded according to a first encoding scheme, and wherein the processing performed by the DSP comprises transcoding each media stream into a corresponding media stream encoded according to a second encoding scheme different from the first encoding scheme.

7. A method according to claim 1, further comprising:

monitoring performance of a first stream being processed by the DSP and identifying a second stream being processed by the same DSP that is interfering with the performance of the monitored stream; and upon determining that the performance of the first stream has diminished to an unacceptable level, re-assigning the second stream to another DSP.

8. A method according to claim 1, further comprising:

monitoring the processing of streams by the DSP with respect to the arrival of times of packets of a separate stream being processed by another DSP to determine whether the DSP is capable of processing the packets of the separate stream in addition to processing the packets of streams already assigned to the DSP; and upon determining that the DSP is so capable, re-assigning the separate stream to the DSP.

9. A media processor, comprising:

a plurality of digital signal processors (DSPs), each DSP having sufficient processing capacity to process packets of up to a predetermined maximum number of media streams within a frame interval with real-time constraints, DSP being operative to (1) buffer the packets of media streams assigned to the DSP for sequential processing of processing units of the streams within the DSP, each processing unit equaling a predetermined number of sequential packets of the stream, and (2) continually process, by processing unit, the buffered packets of the media streams assigned to the DSP, wherein each DSP has an associated desired maximum latency for processing the media streams assigned to the respective DSP;

a DSP controller operative to assign respective ones of a plurality of media streams to corresponding ones of the DSPs, each media stream being characterized by a packet rate that is substantially equal to a corresponding nominal packet rate and by packet arrival times at the media processor that are generally non-deterministic, the frame interval being an inverse of the nominal packet rate, a number of media streams assigned to each DSP being less than the predetermined maximum number and no greater than a quotient of the desired maximum processing latency which is less than the frame interval and a DSP processing latency for a single processing unit.

10. A media processor according to claim 9, wherein the predetermined number of packets in each processing unit is one.

11. A media processor according to claim 9, wherein the predetermined number of packets in each processing unit is an integer greater than one.

12. A media processor according to claim 9, wherein (1) the media streams comprise first and second media streams, (2) the DSP controller is further operative to assign the packets of a number of the respective second media streams to corresponding ones of the DSPs, each second media stream being characterized by a packet rate that is substantially equal to a corresponding nominal packet rate and by packet arrival times at the network node that are generally non-deterministic among themselves but are generally deterministic with respect to the packet arrival times of the packets of the first media streams, wherein each second stream is also processed in processing units equal to the predetermined number of sequential packets of the stream, the number of second media streams assigned to each DSP being less than the difference between the predetermined maximum number and the number of first media streams assigned to the DSP and no greater than the quotient of the predetermined desired maximum processing latency and the DSP processing latency for a single processing unit, and (3) each DSP is further operative (i) to buffer the packets of each second media stream for sequential processing of the processing units of the streams within the DSP, and (ii) to continually process, by processing unit, the buffered packets of the second media streams assigned to the DSP along with the buffered packets of the first media streams assigned to the DSP.

13. A media processor according to claim 9, wherein the media streams are encoded telephony media streams.

14. A media processor according to claim 9, wherein the media streams are telephony media streams encoded according to a first encoding scheme, and wherein the processing performed by the DSP comprises transcoding each media stream into a corresponding media stream encoded according to a second encoding scheme different from the first encoding scheme.

15. A media processor according to claim 9, wherein the DSP controller is further operative to:

monitor performance of a first stream being processed by a given one of the DSPs and identifying a second stream being processed by the same DSP that is interfering with the performance of the monitored stream; and upon determining that the performance of the first stream has diminished to an unacceptable level, re-assign the second stream to another of the DSPs.

16. A media processor according to claim 9, wherein the DSP controller is further operative to:

monitor the processing of streams by a first one of the DSPs with respect to the arrival of times of packets of a separate stream being processed by a second one of the DSPs to determine whether the first DSP is capable of processing the packets of the separate stream in addition to processing the packets of streams already assigned to the first DSP; and upon determining that the first DSP is so capable, re-assign the separate stream to the first DSP.

* * * * *

UNITED STATES PATENT AND TRADEMARK OFFICE
CERTIFICATE OF CORRECTION

PATENT NO. : 7,330,900 B2  Page 1 of 1
APPLICATION NO. : 10/190247
DATED : February 12, 2008
INVENTOR(S) : Eric Burger et al.

It is certified that error appears in the above-identified patent and that said Letters Patent is hereby corrected as shown below:

Column 9, claim 9, line 58, "DSP;" should read --DSP; and--.

Signed and Sealed this

Tenth Day of March, 2009

JOHN DOLL
*Acting Director of the United States Patent and Trademark Office*